Figure 1:
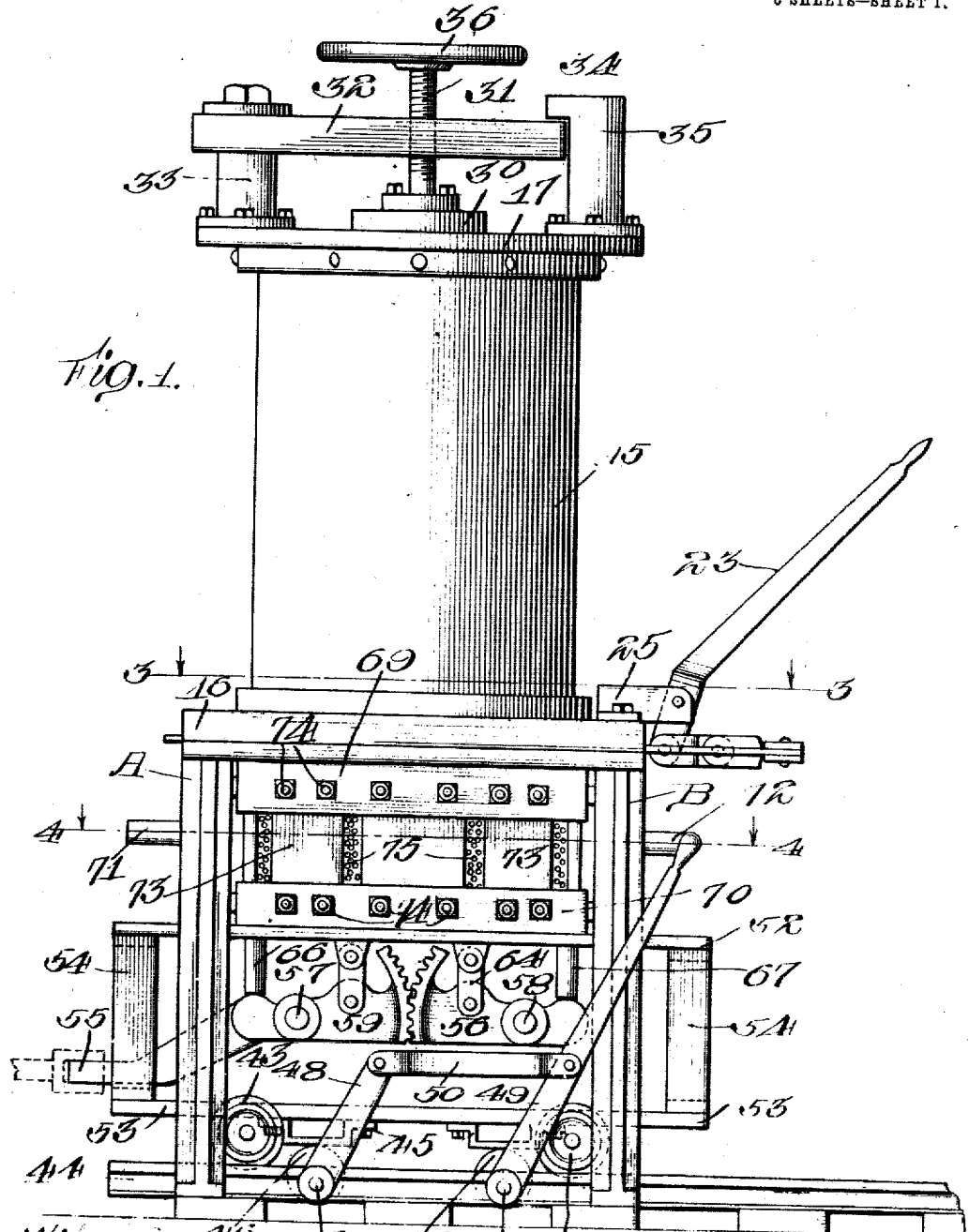

No. 823,530. PATENTED JUNE 19, 1906.
M. J. HEWLETT.
MOLDING APPARATUS.
APPLICATION FILED DEC. 8, 1905.

6 SHEETS—SHEET 1.

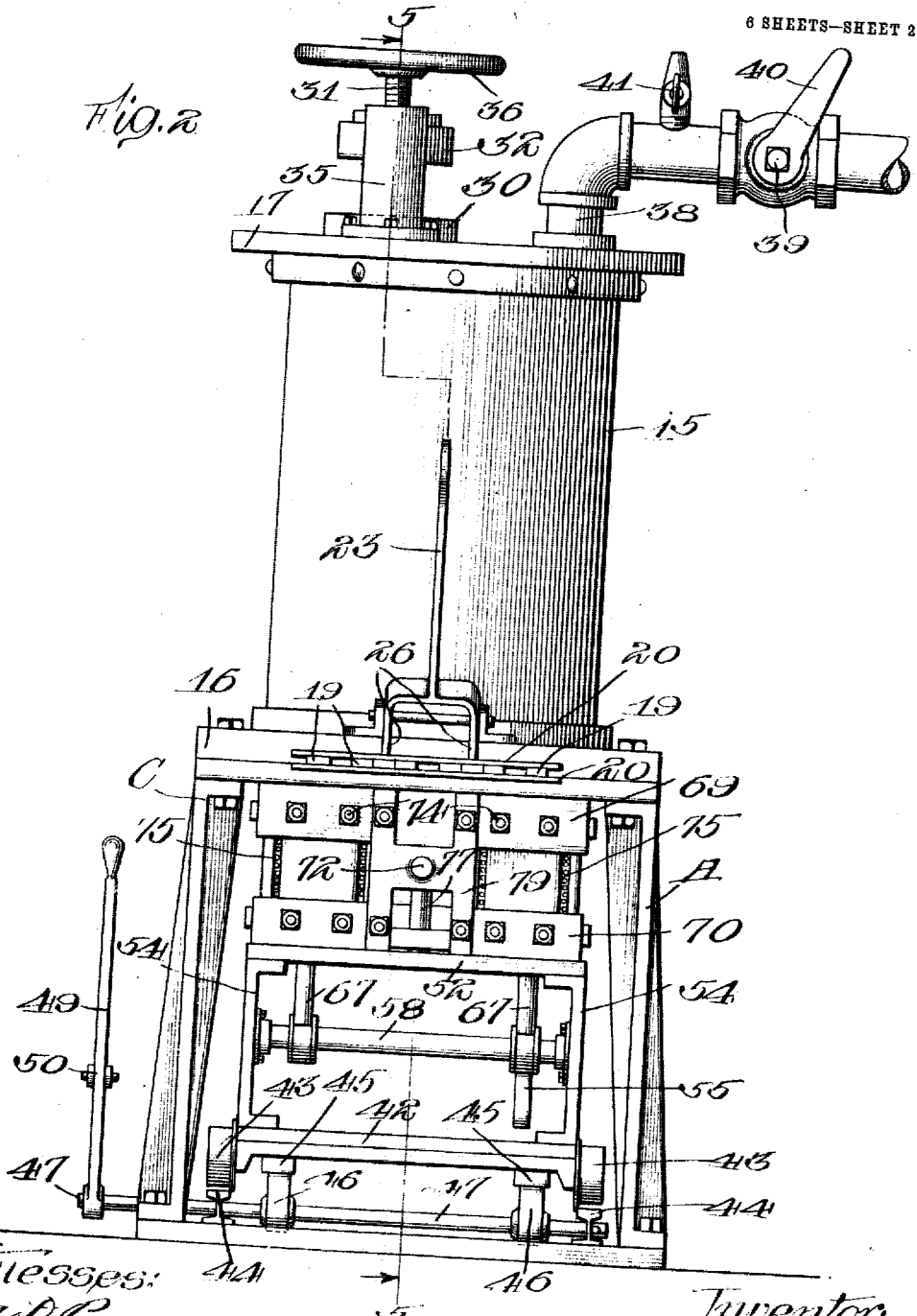

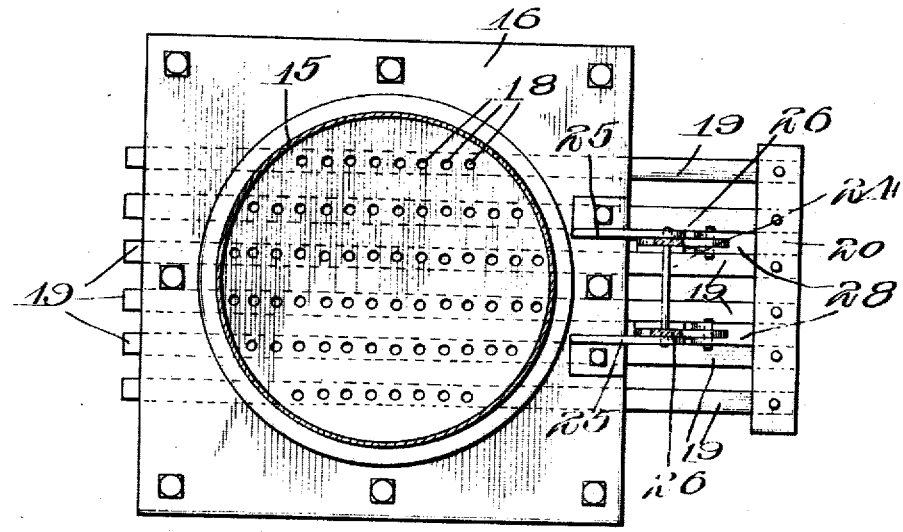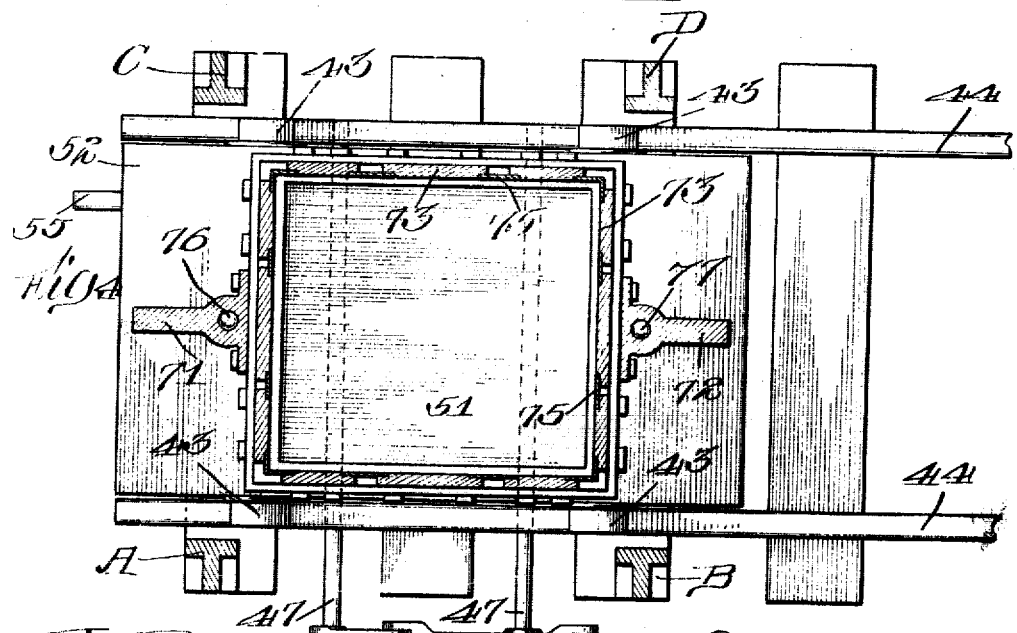

No. 823,530. PATENTED JUNE 19, 1906.
M. J. HEWLETT.
MOLDING APPARATUS.
APPLICATION FILED DEC. 8, 1905.

6 SHEETS—SHEET 4.

Witnesses:
Inventor:
Maddra J. Hewlett,
his Attys.

No. 823,530.　　　　　　　　　　　　　　　PATENTED JUNE 19, 1906.
M. J. HEWLETT.
MOLDING APPARATUS.
APPLICATION FILED DEC. 8, 1905.
6 SHEETS—SHEET 5.
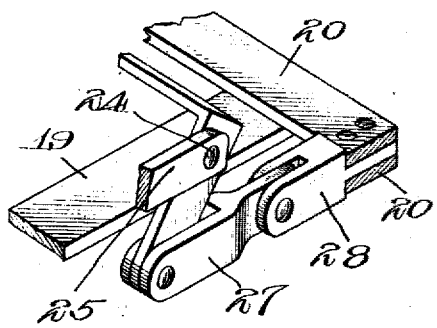
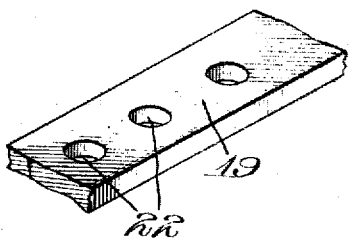
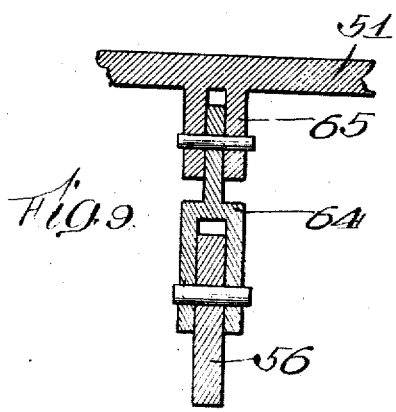
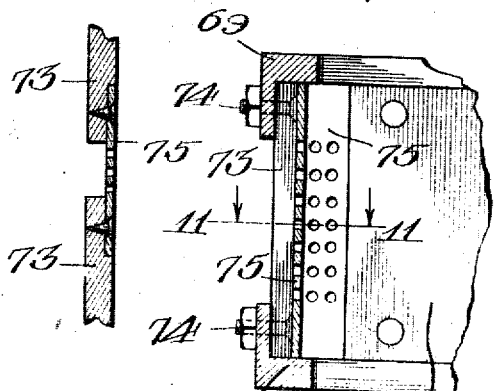
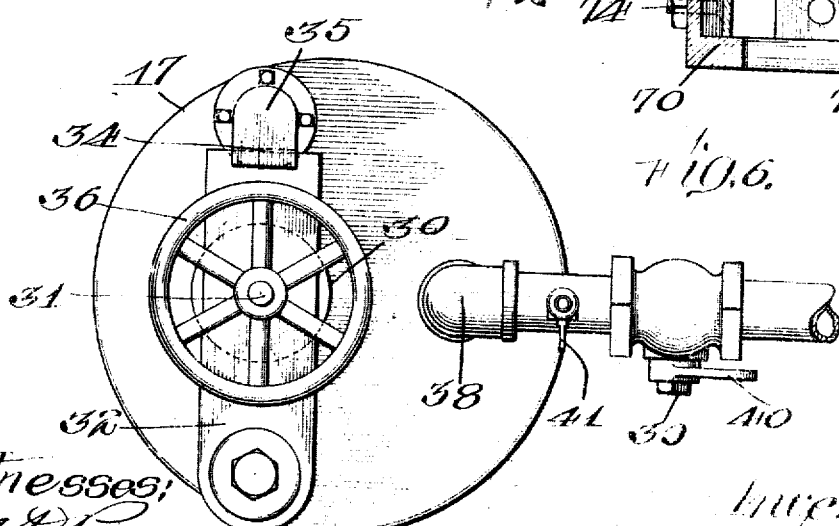

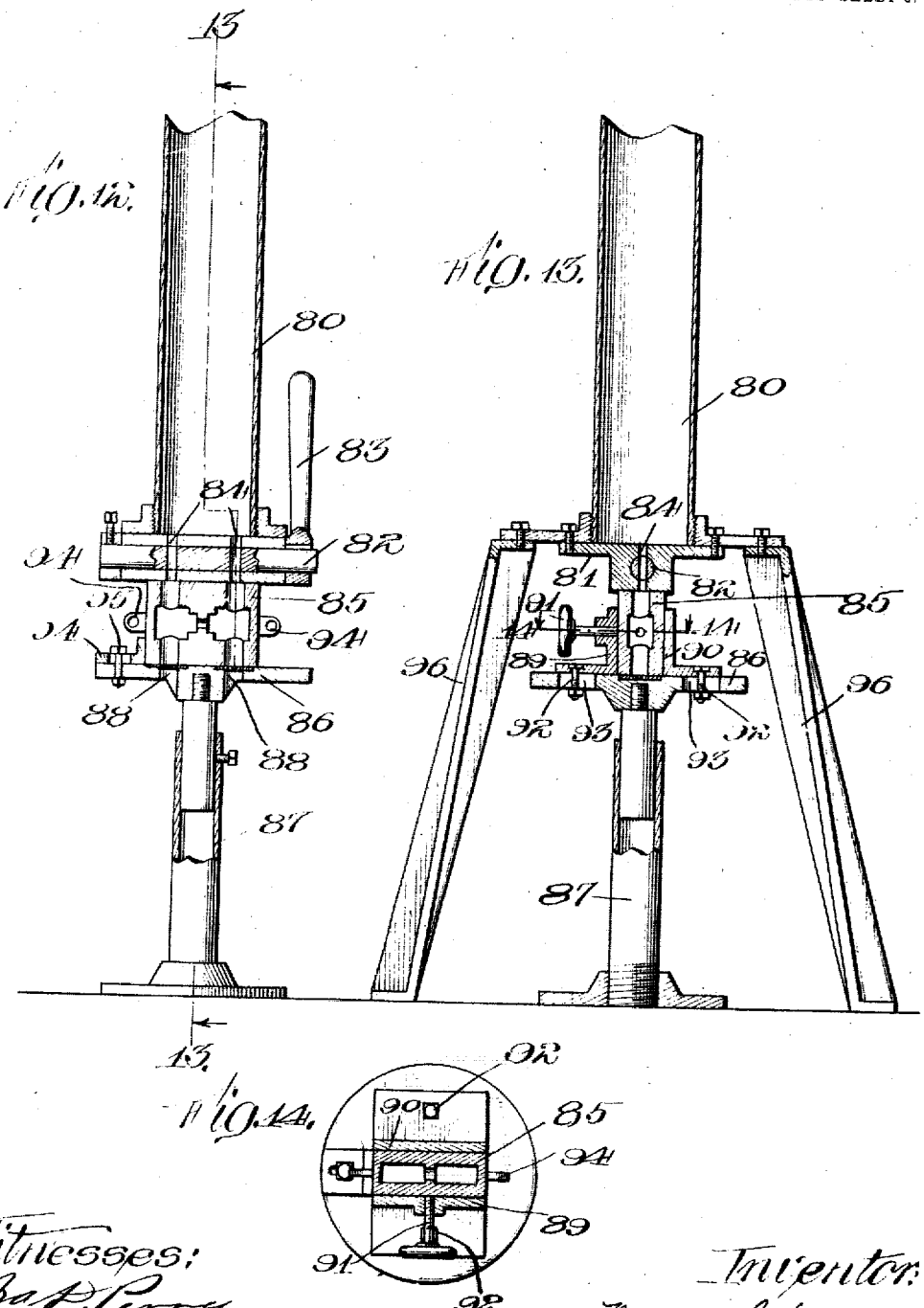

UNITED STATES PATENT OFFICE.

MADDRA J. HEWLETT, OF KEWANEE, ILLINOIS, ASSIGNOR OF ONE-HALF TO HIMSELF AND ONE-HALF TO ALFRED M. HEWLETT, OF KEWANEE, ILLINOIS.

MOLDING APPARATUS.

No. 823,630.  Specification of Letters Patent.  Patented June 19, 1906.

Application filed December 8, 1905. Serial No. 290,981.

*To all whom it may concern:*

Be it known that I, MADDRA J. HEWLETT, a citizen of the United States, residing at Kewanee, in the county of Henry and State of Illinois, have invented certain new and useful Improvements in Molding Apparatus, of which the following is a specification, reference being had to the accompanying drawings.

My invention relates to molding apparatus, and particularly to apparatus for molding sand in molds or flasks according to the process illustrated and described in the application of Alfred M. Hewlett for method of molding, Serial No. 189,390, filed January 16, 1904, and is an improvement or modification of the apparatus illustrated and described in the joint application of said Alfred M. Hewlett and myself, Serial No. 177,353, filed October 16, 1903.

According to the Hewlett method above referred to the sand is carried from a suitable reservoir or storage compartment into the mold or flask by means of the expansive force of compressed air, and in the apparatus shown in the drawings and described in said Hewlett and Hewlett application the sand is stored in a storage-chamber or compartment arranged to communicate at the bottom with the mold or flask through a contracted outlet or outlets. Compressed air is admitted at the top of the sand-chamber and escapes through the outlet at the bottom, carrying sand with it into the mold, which it packs therein by its expansive force, the air after expansion escaping through the cracks in the mold or between the mold, its support, and the sand-chamber. In such apparatus as illustrated in said application the air is admitted to the sand-chamber after the mold is in position to receive its charge of sand, and said apparatus in the form shown is especially designed for use in making cores.

My present application relates to a machine of the same general character involving the same generic features; but it has to do more particularly with a construction designed to be employed in connection with making sand-molds, large cores, or in other situations where a greater quantity of sand is required for each separate operation. It may be said, however, that my improved apparatus is not restricted in its use to large work, but may also be employed generally for molding sand into cores or for molds for any kind of castings made of brass, cast-iron, or any metal to be poured.

The object of my invention is to provide a simple, quick-acting, and efficient molding-machine and flask in which the said method is utilized, the sand being carried into and packed uniformly throughout the flask or other receptacle by the expansive force of compressed air.

A further object is to improve and simplify the construction and operation of molding-machines, thereby rendering them capable of making better molds and doing the work more rapidly, thus reducing the cost of manufacture.

I accomplish these objects as illustrated in the drawings and as hereinafter described. What I regard as new is set forth in the claims.

Figure 5:
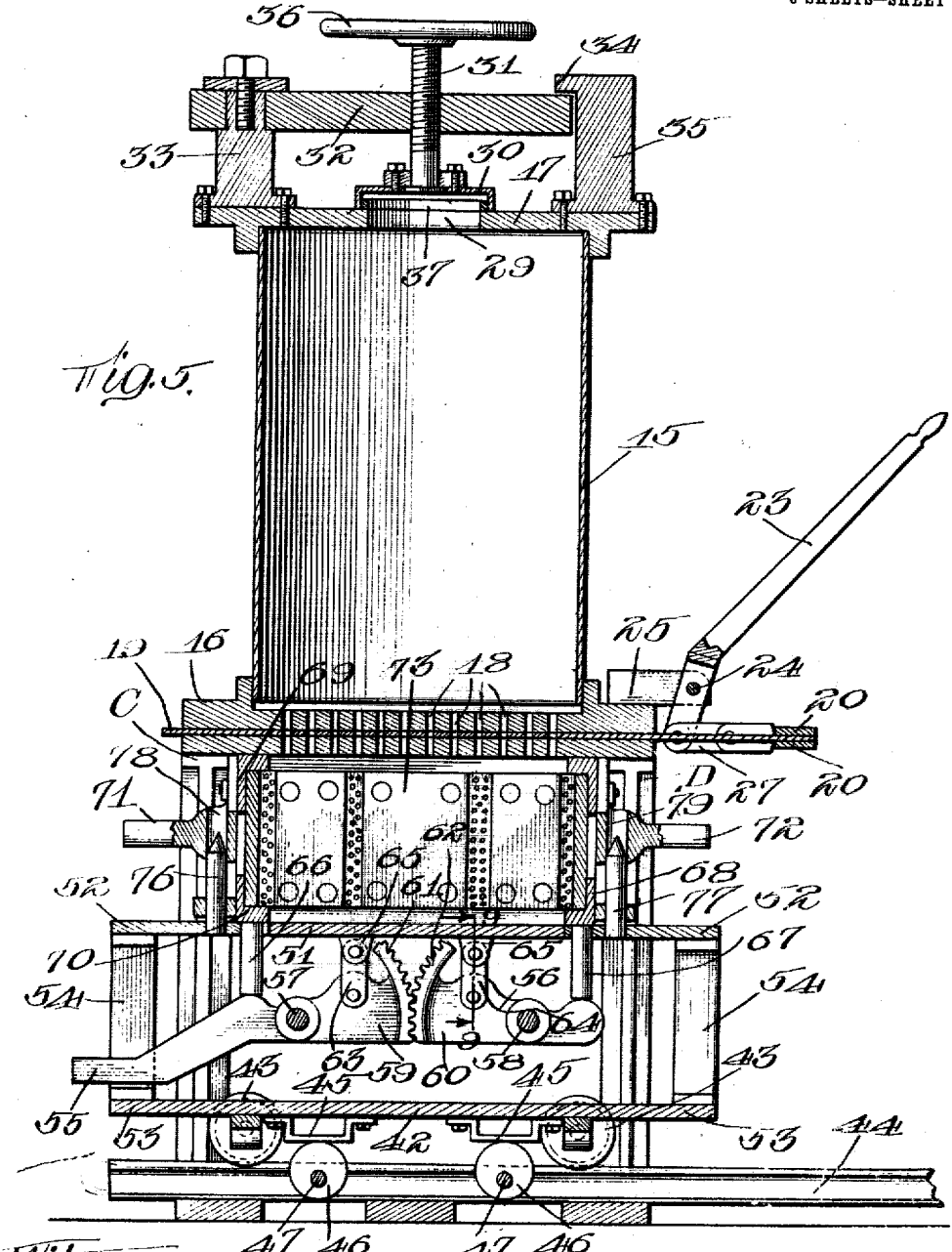

In the accompanying drawings, Figure 1 is a side elevation of my improved molding-machine. Fig. 2 is an end view. Fig. 3 is a cross-section on line 3 3 of Fig. 1. Fig. 4 is a cross-section on line 4 4 of Fig. 1. Fig. 5 is a longitudinal vertical section on line 5 5 of Fig. 2. Fig. 6 is a plan view. Fig. 7 is a perspective view illustrating part of the operating mechanism. Fig. 8 is a perspective view showing part of one of the valve-plates for the sand-chamber. Fig. 9 is a vertical section on line 9 9 of Fig. 5. Fig. 10 is an enlarged detail, being a vertical sectional view of one side of the flask. Fig. 11 is a horizontal section on line 11 11 of Fig. 10. Fig. 12 is a vertical sectional view showing a modification. Fig. 13 is a vertical section on line 13 13 of Fig. 12, and Fig. 14 is a horizontal section on line 14 14 of Fig. 13.

In molding-machines employing the expansive force of compressed air to carry the sand into and pack it in the mold, as describd in the applications above referred to, where the mold is small entirely satisfactory results are secured by providing only a single outlet or passage from the sand or compression chamber to the mold; but I have found that in larger machines or machines employed to pack the sand in a flask or mold that is very large it is desirable to introduce the air carrying the sand into the flask at various points, and to further facilitate the packing of the sand in the flask or mold by allowing the air to escape therefrom through numerous perforations too small to allow the sand to escape, also that in such constructions greater efficiency is secured by retaining the compressed air under suitable compression in the compression or sand chamber instead of admitting a new charge of compressed air thereto at the time of each operation, and these improved features are embodied in the machine which forms the subject-matter of this application. Certain other improved features are also embodied therein, which are fully illustrated in the drawings, and will be hereinafter described.

Referring to the drawings for a detailed description of the specific embodiment of my invention therein illustrated, 15 indicates the sand or compression chamber or reservoir in which sand used to fill the molds or flasks is placed in bulk, a suitable quantity being employed, so that a fresh supply is provided only after a greater or less number of operations. In other words, the capacity of the sand-chamber is considerably greater than that of any one of the flasks or molds to be filled. Said chamber is constructed to withstand a pressure of compressed air usually from about eighty to one hundred pounds to the square inch; but it will be understood that where it is desired to employ greater or less pressure the strength of the sand-chamber will depend upon such requirements. Preferably the sand-chamber is cylindrical in form, as shown in Fig. 3; but this also may be varied.

The sand-chamber is closed at the bottom by a bottom plate 16 and at the top by a top or cover plate 17, as best shown in Fig. 5. The bottom plate is carried on suitable standards A B C D, as shown in Figs. 1 and 5. The bottom plate is provided with a number of perforations 18, disposed at intervals over its surface and extending through it, as shown in Fig. 5. It is also provided with a number of valve plates or slides 19, one of which is shown in Fig. 8 and which are further illustrated in Figs. 2, 3, and 5. Said valve-plates are arranged to slide in suitable horizontal passages in the bottom plate 16 and are connected at or near one end by cross-bars 20, (best shown in Figs. 2, 3, and 5,) one cross-bar being preferably placed above and the other below said plate, as illustrated. The valve-plates 19 are provided with perforations 22, as best shown in Fig. 8, which perforations are adapted to register with the passages 18 in the bottom plate when said plates are moved to the proper position, as illustrated in Fig. 5. By this construction by reciprocating the plates 19 the outlets 18 may be opened or closed to permit the sand and compressed air to escape or to confine them in the sand-chamber. The plates therefore compose collectively an outlet-valve by which the escape of compressed air and sand is controlled. Said outlet-valve is operated by means of a lever 23, mounted upon a suitable pivot 24, carried by a stud 25. The lower end of the lever 23 is forked to provide arms 26, as shown in Fig. 2, which are connected by links 27 with blocks 28, carried at the ends of the cross-bars 20, as best shown in Fig. 7. Instead of this arrangement any other suitable arrangement may be employed for reciprocating the valve.

The top or cover plate 17 is provided with a suitable opening 29, through which sand is introduced. Said opening is covered by a cap 30, carried at the lower end of a screw 31, fitted in a swinging bar 32, as shown in Figs. 1 and 5. Said bar is mounted at one end on a suitable stud or pivot 33, so that it may swing over or away from the opening 29 to carry the cap 30 into or out of operative position. When the cap is in operative position, one end of the bar 32 lies under a lug 34, projecting from a suitable stud 35, carried by the cover-plate, as shown in said figures, so that the cap 30 may be forced down tightly over the opening 29. For this purpose the screw 31 is provided with a hand-wheel 36. The cap 30 is provided with a suitable packing-ring 37, so as to insure a tight closure of said opening, and the connection between the screw 31 and the cap 30 is packed or otherwise made tight. 38 indicates an air-pipe, which connects with the sand-chamber through a suitable opening in the cover-plate 17, as shown in Figs. 2 and 6. Said air-pipe is provided with a valve 39, controlled by a lever 40 or other suitable means for admitting air to the sand-chamber and for opening and closing the pipe 38. Said pipe communicates with a suitable source of supply of compressed air, so that by opening the valve 39 air is admitted to the sand-chamber, and by closing said valve the air is confined in said chamber. By connecting the sand-chamber with suitable mechanism for maintaining a substantially constant pressure in the sand-chamber the valve 39 may be allowed to remain open or partly open during the operation of molding. 41 indicates a petcock or equivalent device for reducing the pressure of the air in the sand-chamber. By closing the valve 39 and opening the petcock 41 the pressure in the sand-chamber may be reduced as desired.

42 indicates a truck or carriage which is adapted to convey the flask into and out of operative position. Said truck is mounted on wheels 43, adapted to run on a track 44, as shown in Fig. 5, and is preferably provided on its under side with blocks or brackets 45 adapted to overlie cams 46 when the truck is in position to support the flask in operative position. Said cams are carried by shafts 47, suitably mounted and connected by levers 48 49 and connecting-rods 50, as shown in Fig. 1. The levers 48 49 are parallel, so that by operating the lever 49 both cams 46 may be turned up into engagement with the blocks or brackets 45, thereby lifting the truck from the rails 44 and forcing the flask tightly up against the under side of the bottom plate 16.

51 indicates a pattern-plate carried at the upper side of the carriage or truck 42, which, as shown in Fig. 5, is composed of upper and lower decks 52 53, respectively, connected by uprights 54. Said pattern-plate is held in position and is lowered, when desired, by means of levers 56 56, mounted on pivots 57 58, respectively, and having segmental arms 59 60, the adjacent faces of which are provided with racks 61 62, which intermesh, as shown in Fig. 5. Said arms 59 60 are connected by links 63 64 with lugs 65, projecting from the under side of the pattern-plate 51, as shown in Fig. 5, so that by operating the lever 55 both levers 55 56 are rocked, correspondingly moving the pattern-plate.

When the parts are in the position shown in Fig. 5, the pattern-plate is held in its uppermost position. By raising the lever 55 the pattern-plate may be lowered to carry the pattern down out of the flask, which rests upon the upper deck of the carriage, around and over the pattern-plate, as shown in Fig. 5. 66 67 indicate pins, which rest on the levers 55 56 at the opposite sides of the fulcrums thereof from the arms 59 60 and have their upper ends fitted in suitable bearings in the upper deck 52, as shown in Fig. 5. By this construction when the pattern-plate descends the pins 66 67 rise, the object of which arrangement will be hereinafter set forth. 68 indicates the flask, the general construction of which is best shown in Figs. 1, 5, and 10. Said flask is composed of upper and lower flanged rings 69 70, respectively, which are preferably of iron, but may be made of any other suitable material. Said rings are connected by trunnions 71 72 at diametrically opposite points and are further connected by a series of boards 73, secured to the vertical flanges of said rings, as shown in Fig. 10, preferably by bolts 74. Said boards are placed at intervals around the rings 69 70, leaving spaces between them, as shown in Fig. 5, and such intermediate spaces are covered by perforated sheet-metal strips 75, or wire gauze, or other suitable material. The perforations are small enough to retain the sand, although permitting the escape of air. It will be understood that the flask may be made of any suitable shape or material; but I prefer to use the construction above described.

As shown in Fig. 5, the flask is placed upon the carriage around the pattern-plate 51, resting upon the pins 66 67, so that when said pins are projected at the time that the pattern-plate is depressed the flask is raised above the deck 52. During this operation the flask is guided by pins 76 77, rising from the upper deck 52 of the carriage and fitting in suitable bearings 78 79 in the trunnions 71 72, as shown in Fig. 5. The lever 55 is operated to raise the flask and depress the pattern-plate after the making of a mold and when the carriage is out from under the sand-chamber. The size of the different parts is such that when the flask is on the carriage and the carriage is resting on the rails the flask may move freely under the bottom plate 16, but may be moved up closely in contact therewith by means of the cams 46, thus securing a tight closure between the upper portion of the flask and the bottom plate, making close connection between the sand-chamber and the flask.

In operation, the sand-chamber having been supplied with sand the cap 30 is placed tightly over the opening 29 and compressed air is admitted to the sand-chamber. At this time the outlet-valve is closed. When a flask is in position under the bottom plate 16 and has been forced up into contact therewith in the manner already described, the outlet-valve is opened by operating the lever 23 and immediately closed again, the valve being open only momentarily. The opening of the outlet-valve permits a portion of the compressed air in the sand-chamber to escape through the passages 18, carrying sand with it into the flask and packing it therein by its expansive force, as described in the applications hereinbefore referred to. The compressed air in the sand-chamber is not, however, exhausted, and its pressure is only slightly reduced momentarily. During these operations the inlet-valve 39 is kept open and the petcock 41 is closed. This operation may be repeated until the supply of sand gets low, when the valve 39 is closed and the petcock 41 opened to reduce the pressure in the sand-chamber to the normal. The cap 30 is then removed and a fresh supply of sand introduced.

In Figs. 12 to 14 I have illustrated a modified form of apparatus operating on the same general principle, but differing in some details of construction. In the apparatus illustrated in said figures the sand-chamber 80 is provided with a bottom plate 81, having therein a rotary valve 82, operated by a lever 83 and arranged to control the outlet-passages 84, as shown in Figs. 12 and 13. Said apparatus also shows the flask or mold 85 as being carried on a rotary table or support 86, mounted on a suitable pedestal 87, upon which it is vertically adjustable. Outlets 88 are provided in the table 86 for the escape of exhaust-air, said outlets being protected by finely-perforated material, as already described. The molds are clamped between guides 89 90 by means of a screw 91, as shown in Figs. 13 and 14. Said molds are adjustable toward and from each other by means of bolts 92, fitted in slots 93 in the table 86, as shown in Fig. 13.

An adjustable end stop 94 is also provided to limit the endwise movement of the mold, said stop being held in its different positions of adjustment by a bolt 95, as shown in Figs. 12 and 14. The bottom plate 81 is supported by standards 96, connected with it near its edges, so as to permit free access to the under surface of the bottom plate, as shown in Fig. 13. So far as the operation of actual molding is concerned the apparatus of Figs. 12, 13, and 14 is substantially the same as that of the other apparatus; but in other respects it is a simplification designed for use in connection with the making of smaller molds where the mold or flask may be readily placed in position by hand.

It will be observed that by providing a plurality of outlet-passages for the compressed air and sand a general distribution of the air and sand throughout the mold or flask, together with its proper packing at all points therein, is insured. Furthermore, by varying the number of the perforated valve-plates 19 and the arrangement of the perforations therein it is possible to easily vary the distribution of the air and sand where such special distribution is deemed desirable to meet peculiar conditions.

It will be understood that while I have described with considerable minuteness the particular embodiments of my invention illustrated in the accompanying drawings I do not restrict myself to the specific details of the construction illustrated and described, as my invention includes generically the subject-matter of the broader claims as well as the more specific features pointed out in the narrower claims.

That which I claim as my invention, and desire to secure by Letters Patent, is—

1. A sand-molding apparatus, comprising a sand-holding receptacle having a plurality of sand-outlets, means for supporting the mold adjacent thereto, valve mechanism controlling said outlets, and means for supplying compressed air to said receptacle.

2. A sand-molding apparatus, comprising a sand-receptacle having a plurality of sand-outlets in the lower portion thereof, means for supporting the mold adjacent to said outlets, valve mechanism controlling said outlets, and means for supplying compressed air to said receptacle.

3. A sand-molding apparatus, comprising a sand-receptacle having a plurality of sand-outlets in the bottom thereof, means for supporting the mold adjacent to said outlets, valve mechanism controlling said outlets, and means for supplying compressed air to said receptacle.

4. A sand-molding apparatus, comprising a mold-support, and means for introducing compressed air charged with sand into the mold at a plurality of points and permitting the air to expand in the mold and distribute the sand therein by its expansive force.

5. A sand-molding apparatus, comprising a mold-support, and means for introducing compressed air charged with sand into the mold at a plurality of points, said means having a plurality of contracted discharge-passages.

6. A sand-molding apparatus, comprising a sand-chamber adapted to contain sand under pressure, means for admitting sand to the mold, and valve mechanism therefor.

7. A sand-molding apparatus, comprising a sand-chamber adapted to contain sand under pressure, outlet-passages arranged to supply the sand to the mold at a plurality of points, and valve mechanism for said outlet-passages.

8. A sand-molding apparatus, comprising a sand-chamber having a plurality of outlets, means for supporting the mold adjacent to said outlets, a mold having a plurality of air-escape openings, and means for discharging compressed air charged with sand from said sand-chamber into said mold.

9. A sand-molding apparatus, comprising a sand-chamber having a plurality of outlets, means for supporting the mold adjacent to said outlets, a mold having a plurality of air-escape openings, and valve mechanism controlling said outlets.

10. A sand-molding apparatus, comprising a sand-receptacle having a plurality of outlet-passages in the bottom thereof, valve mechanism controlling said outlet-passages, means for supporting the mold adjacent to said outlet-passages, and means for supplying compressed air to said sand-receptacle.

11. A sand-molding apparatus, comprising a sand-receptacle having a plurality of outlet-passages in the bottom thereof, a plurality of valve members controlling said outlet-passages, means for supporting the mold adjacent to said outlet-passages, and means for supplying compressed air to said sand-receptacle.

12. A sand-molding apparatus, comprising a sand-receptacle having a plurality of outlet-passages in the bottom thereof, a plurality of sliding valve-plates controlling said outlet-passages, means for supporting the mold adjacent to said outlet-passages, and means for supplying compressed air to said sand-receptacle.

13. A sand-molding apparatus, comprising a mold or flask having a plurality of minute openings adapted to permit the escape of air therefrom while sand is retained therein, and means for introducing compressed air charged with sand into said mold.

MADDRA J. HEWLETT.

Witnesses:
   I. L. PRIESTMAN,
   F. L. PINKHAM.